United States Patent [19]

Bock et al.

[11] 4,163,247

[45] Jul. 31, 1979

[54] COLOR TELEVISION CAMERA WITH TIME MULTIPLEXING OF LUMINANCE AND CHROMINANCE INFORMATION

[75] Inventors: Gerd Bock, Brunswick; Gerd Grand, Braunschweig-Watenbüttel; Andreas Ilmer, Brunswick; all of Fed. Rep. of Germany

[73] Assignee: Robert Bosch GmbH, Stuttgart, Fed. Rep. of Germany

[21] Appl. No.: 792,260

[22] Filed: Apr. 29, 1977

[30] Foreign Application Priority Data

Apr. 30, 1976 [DE] Fed. Rep. of Germany ....... 2619027

[51] Int. Cl.² .............................................. H04N 9/04
[52] U.S. Cl. ........................................ 358/12; 358/41
[58] Field of Search ....................... 358/9, 12, 41, 142, 358/145

[56] References Cited

U.S. PATENT DOCUMENTS 3,781,463  12/1973  Van den Bussche ................. 358/12

Primary Examiner—Robert L. Richardson
Attorney, Agent, or Firm—Littlepage, Quaintance, Murphy, Richardson and Webner

[57] ABSTRACT

The invention concerns a color television camera for providing a color television signal suitable for recording. The camera comprises separate transducer means for deriving the luminance and chrominance information bearing signals, the transducer means being controlled so that the color information scanning takes place during the line frequency flyback of the luminance scanning. The luminance and chrominance signals are subsequently interleaved by time division multiplex and the resulting signal can be recorded by the use of simple magnetic recording devices.

5 Claims, 10 Drawing Figures

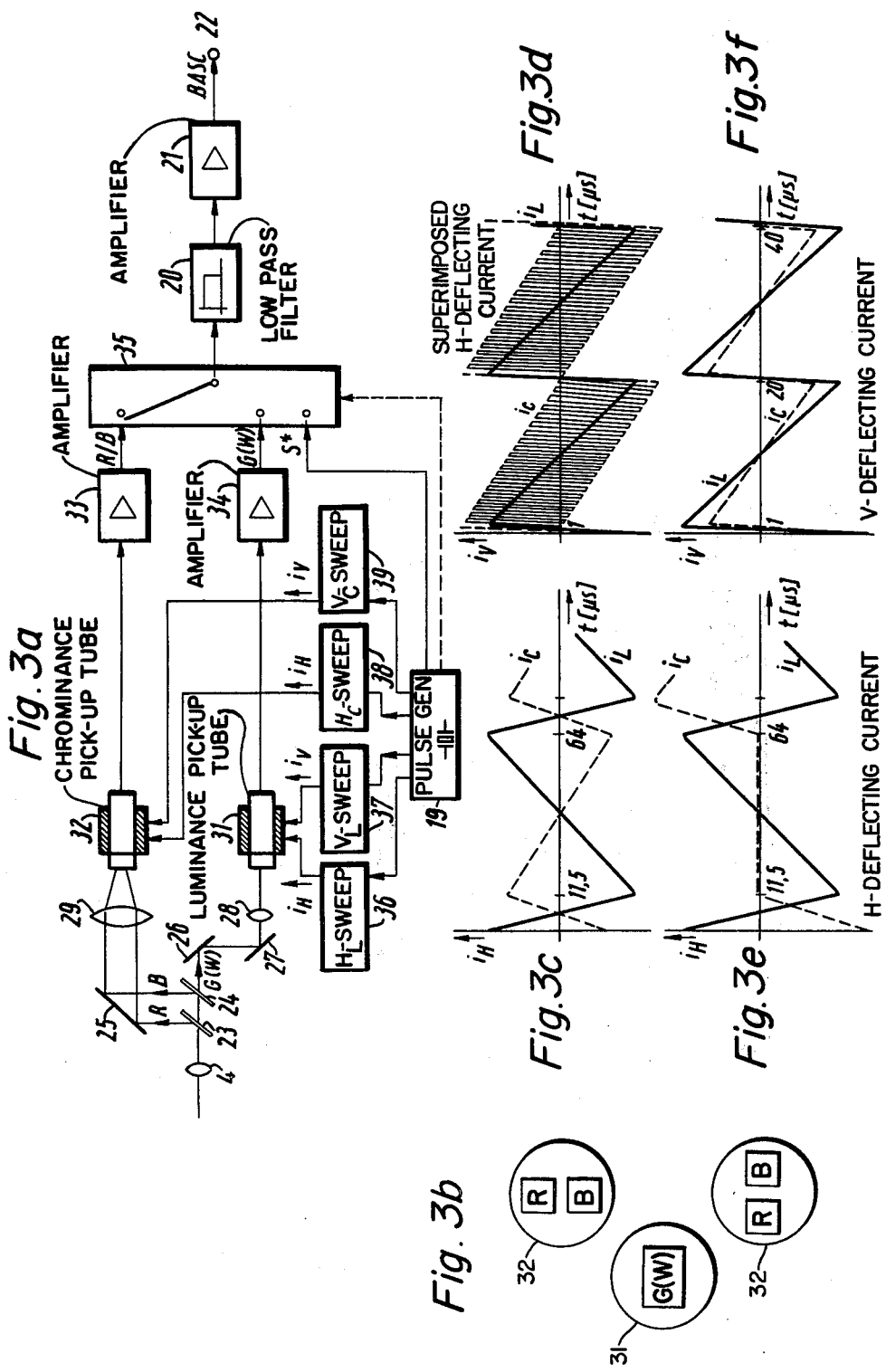

COLOR TELEVISION CAMERA WITH TIME MULTIPLEXING OF LUMINANCE AND CHROMINANCE INFORMATION

BACKGROUND OF THE INVENTION

1. Field of the Invention

The invention relates to a television camera for producing a colour television signal suitable for subsequent recording.

2. Description of the Prior Art

Television transmission require a substantial technical capital investment notwithstanding important advances which have been made in miniaturisation. For converting a scene being viewed into a colour television signal it is common practice to employ a colour television camera having a respective pick-up tube for each of three colour components, although colour television cameras are also known in which the conversion is effected with one pick-up tube or two pick-up tubes, of which one tube generates the luminance signal whilst the chrominance information is converted into electrical signals by the other tube. Normally there are produced two colour value signals or two colour difference signals, which are then combined with the luminance signal to form a television signal according to one of the known standards (PAL, NTSC, SECAM).

If there is no radio link or cable connection between the shooting location and the transmitter then it is necessary to have, in addition to the colour television camera, magnetic recording equipment which is suitable for the recording of colour television signals.

This last mentioned equipment is however quite expensive, in particular if it is required to record colour television signals according to the PAL or NTSC system. For this reason there have been a number of proposals which have been concerned with different methods of encoding the colour television signals for the purpose of recording them. For example in German Patent Specification 20 56 684 there is disclosed a method in which the recording of the colour information takes place during a portion of the horizontal frequency blanking interval of the luminance signal. If this known method is adopted it is indeed possible for the magnetic recording equipment to be more simply designed, but additional capital outlay is involved since code converters must be used for recording and reproduction of colour television signals according to the normal television standards.

An object of the invention is to provide a colour television camera which produces a colour television signal which is directly suitable for recording by such a method without the use of a code converter.

SUMMARY OF THE INVENTION

Accordingly, the present invention provides a colour television camera comprising means for splitting incident light into luminance and chrominance components, separate luminance and chrominance opto-electric transducer means arranged to receive on light sensitive surfaces thereof focussed images of the luminance and chrominance components respectively of the incident light, respective means for effecting line-by-line scanning of the light sensitive surfaces of the luminance and chrominance transducer means to produce electrical signals bearing luminance and chrominance information respectively, the scanning means for the chrominance transducer means being adapted to effect line scanning of the chrominance component during the line blanking intervals of the scanning means for the luminance component, and means for interleaving by time division multiplex electrical signals derived from the luminance and chrominance transducer means.

BRIEF DESCRIPTION OF THE DRAWING

Embodiments of the invention will now be described with reference to the accompanying drawings in which:

FIGS. 3a thru 3f are schematic block diagrams and related timing diagrams of a second embodiment of the invention.

Equivalent components in the various figures are provided with like reference characters.

DESCRIPTION OF PREFERRED EMBODIMENTS

Figure 1:
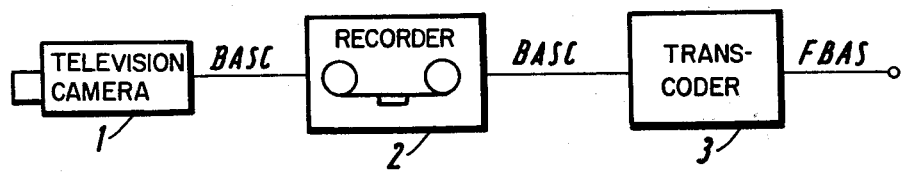
FIG. 1 is a much simplified block schematic diagram of a recording system embodying the present invention.

In the recording system shown in FIG. 1 a colour television signal is produced in the colour television camera 1, which signal contains the luminance information during the normal scanning period of each line, and contains the colour or chrominance information during the flyback time. According to requirements, it is also possible to include blanking and synchronising signals in the signal which is of non-standard form as compared with the presently conventional PAL or NTSC signal. This modified signal will be referred to in the following description as the BASC signal. This signal can be recorded by means of relatively simple magnetic recording equipment. For reproducing the BASC signal and for its further distribution to television receivers it is necessary that the BASC signal be converted into a standard FBAS signal by means of a transcoder 3. The present invention is concerned with the camera 1 and not with the details of the recording equipment 2 or the transcoder 3 and these latter will not be further described.

Figures 2A, 2B, 2C:
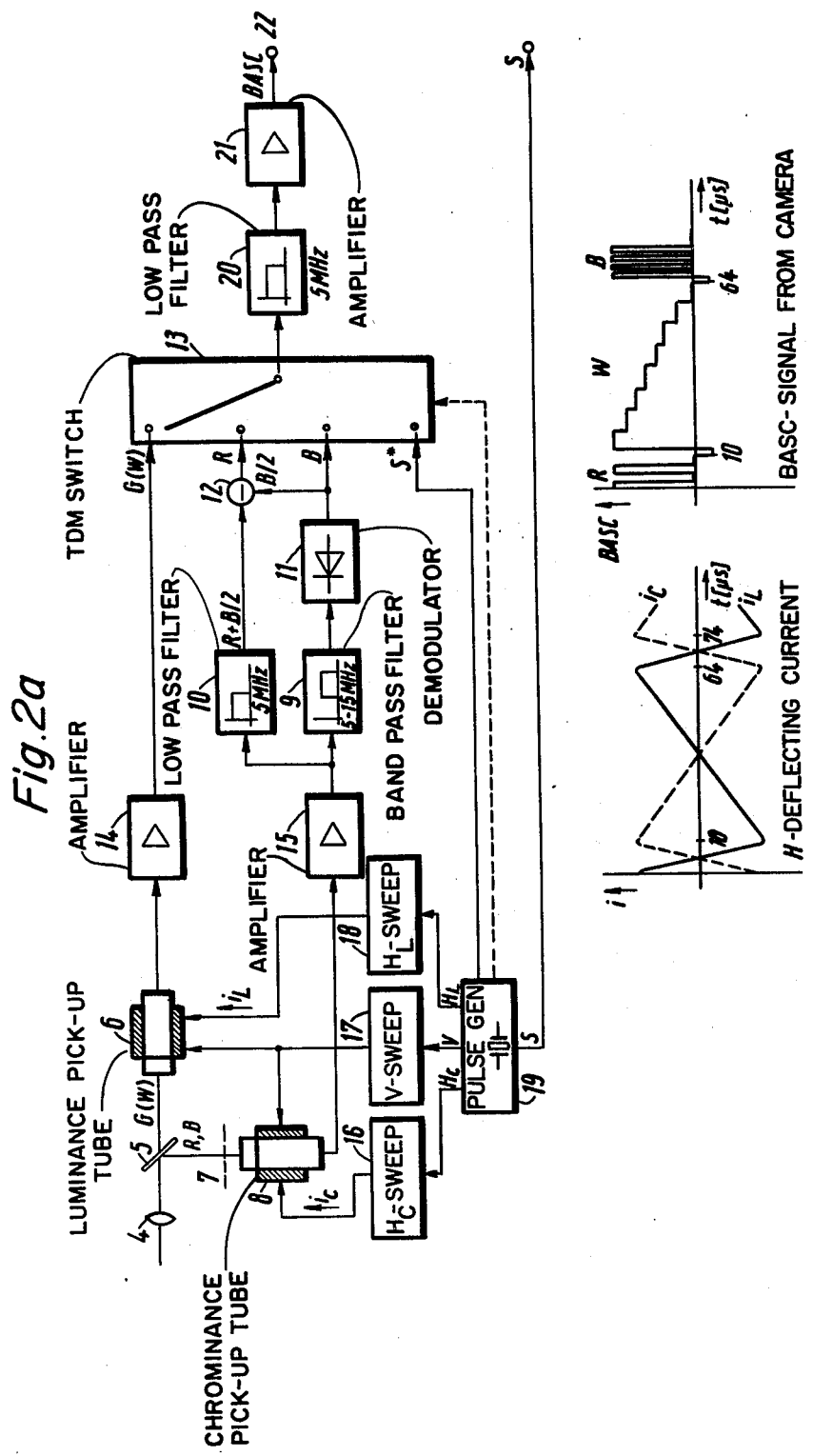
FIGS. 2a, 2b and 2c are schematic block diagrams and related timing diagrams of a first embodiment of the invention.

A practical example of the colour television camera 1 will be described with reference to FIG. 2. In this connection FIG. 2a is a block schematic diagram of the camera, FIG. 2b shows time diagrams of the deflecting currents used in the camera, and FIG. 2c is a time diagram of the BASC signal delivered by the camera.

An image of the scene being viewed by the camera is formed by the objective 4, this image being split up by passing the incident light through a dichroic mirror 5 into the components green G (or white W) and red/blue R,B. The green or white component serves to provide the luminance information, and the red/blue component the chrominance information. The green (or white) image is formed upon the target of a first pick-up tube 6 in which a conventional luminance video signal is generated by scanning line-by-line with a normal time base (see H deflecting sawtooth current $i_L$, FIG. 2b). The red/blue colour image is formed on the target of a second pick-up tube 8 after passage through a so-called blue-stop colour stripe filter 7 (a filter with alternating transparent and yellow colour stripes). The charge pattern of this target is scanned line-by-line during the horizontal (line) blanking gaps of the luminance scanning operation (see H deflecting sawtooth current $i_C$, FIG. 2b), so that there is formed both a video signal with colour information R+½B as well as a carrier frequency colour signal B produced by the filter 7, both with a compressed time base. The modulation of colour signals by means of stripe filters is described in various patent specifications and publications dealing with single-tube camera systems and double-tube camera systems, and is therefore sufficiently well known not to need further description. Usually the carrier frequency which is employed is a frequency which is as low as possible but which nevertheless permits, for a prescribed colour signal band width, the avoidance of any substantial overlap of the carrier frequency signal and the base band signal (the video signal R+½B in the present case). In the present case, given a chrominance band width of 1 MHz, a carrier frequency of about 10 MHz should be produced by the stripe filter for the time base compressed signal B. The colour signals B and R+½B are separated from the total composite signal from 8 by means of a band pass filter 9 and a low pass filter 10 respectively. The middle frequency of the band pass filter corresponds substantially to the carrier frequency produced by the filter 7. The colour signal B is obtained after AM demodulation in the demodulator 11. From the base band signal R+½B the component ½B is removed by subtraction in the circuit 12 so that the red signal R is available at the output of the latter. By means of an electronic switch 13 the three signals now available, that is to say the luminance signal and the two colour signals R and B, are interleaved with each other by time division multiplex. If necessary suitable synchronising signals S can be added. The amplifiers 14 and 15 serve to amplify in the conventional manner the signals produced by the pick-up tubes.

Whilst the vertical deflecting circuit 17 and the horizontal deflecting circuit 18 for the luminance pick-up tube 6 conform to the circuitry normally employed in television practice, the horizontal deflecting circuit 16 for the chrominance pick-up tube 8 represents a special case in that a portion of the time which normally is regarded as the flyback period is in this case the useful portion of the scan. The scanning functions, and that of the switching device 13, are controlled by means of a pulse generator 19. The synchronising signal is also provided by this generator.

The output of the switching device 13 is connected through a low pass filter 20 and an amplifier 21 to the camera output terminal 22. The BASC signal available at this output is shown schematically in FIG. 2c. In this example the picture content represented by this signal is a colour bar, as is frequently employed for testing purposes in the television art. In each line period of the luminance signal during the time from t=0 to 10 μs the signals R and B are transmitted alternately line-by-line in compressed form. After a subsequent brief synchronising pulse, the luminance signal W is transmittted until the time t=64 μs. In the example here shown the brief synchronising pulse is again provided at the end of each line. The luminance signal and synchronising signals thus occupy 54 μs of each line, with the luminance signal itself occupying substantially 80% of the line period.

It is alternatively possible in the chrominance pick-up tube to image the colour components red and blue separately on the target either side by side or one above the other on a smaller image scale. Such an embodiment is represented in FIG. 3. In this connection, FIG. 3a is a block schematic diagram of the camera, FIG. 3b shows the arrangement of the images on the targets of the luminance and chrominance pick-up tubes 31 and 32 of FIG. 3a, and FIGS. 3c to 3f are time diagrams of the deflecting waveforms. The time compression is again obtained in this case by suitable choice of the deflecting currents in a chrominance pick-up tube 32. The green or the white luminance signal is generated in a pick-up tube 31 with a normal wide band time base, as was done in the arrangement of FIG. 2. The beam subdivision in the camera of FIG. 3a is effected in the present case in such manner that two colour component images R and B are arranged on the target either one above the other or side by side as is indicated in FIG. 3b. This beam subdivision is achieved by the dichroic mirrors 23 and 24, and by the mirrors 25, 26 and 27. In this type of beam subdivision, because the optical path between the objective 4 and the pick-up tubes 31 and 32 is quite lengthy, further lens systems 28 and 29 are provided.

The deflecting currents for the pick-up tubes 31 and 32 are produced by the deflecting generators 36, 37 and 38, 39 respectively, which are synchronised by the pulse generator 19.

The deflecting currents for the luminance tube 31 correspond to the conventional deflecting currents, whilst those for the chrominance tube 32 are respectively different depending on whether the images are arranged one above the other or side by side.

In the case where the images are one above the other, deflecting currents are employed such as those represented in diagrams 3c and 3d. In diagram 3c there are shown the horizontal deflecting currents, the current $i_L$ for the luminance tube 31 being shown in full lines and the current $i_C$ for the chrominance tube 32 being shown in dashed lines. The diagram 3d shows the vertical frequency deflecting currents. Whilst that for the luminance tube 31 exhibits the normal sawtooth shape ($i_L$), the deflecting current $i_C$ for the chrominance tube 32 is composed of a component of sawtooth shape and a superimposed rectangular component of half the line frequency. In this way there is alternate scanning line by line of one line of the red image and one line of the blue image.

In the case where the two colour component images R,B are arranged side-by-side, the appertaining deflecting currents are shown in diagrams 3e and 3f. As is evident from diagram 3f the vertical frequency deflecting currents for both of the pick-up tubes are of conventional sawtooth shape, that for the chrominance tube having a smaller amplitude because the corresponding images are smaller. Of the two horizontal frequency deflecting currents, which are shown in diagram 3e, only the deflecting current $i_C$ which is shown in dashed lines, and which appertains to the chrominance tube 32, has a nonstandard characteristic. This characteristic provides that the deflection takes place at one half the line frequency, the scanning beam of the chrominance tube scanning the colour component images alternately line-by-line during the horizontal blanking gaps of the luminance signal, the scanning beam remaining stationary between the two colour component images during each forward scan of the luminance tube.

The signals produced by the pick-up tubes 31 and 32 are amplified in the normal manner by the amplifiers 33 and 34 and delivered to an electronic switching device 35. Because by the above described method of scanning the signals R and B are already available in line sequential form, it is possible for the switching device 35 to be of simpler design than the switching device 13 (FIG. 2a). The output signal of the switching device 35 is delivered to the output terminal 22 of the camera through a low pass filter 20 and an amplifier 21.

It is also possible, by suitable choice of the deflecting process, to produce a time division multiplex signal from a conventional three-tube or four-tube camera.

We claim:

1. A color television camera comprising means for splitting incident light into luminance and chrominance components, separate luminance and chrominance opto-electric transducer means arranged to receive on light sensitive surfaces thereof focussed images of the luminance and chrominance components respectively of the incident light, respective means for effecting line-by-line scanning of the light sensitive surfaces of the luminance and chrominance transducer means to produce electrical signals bearing luminance and chrominance information respectively, the scanning means for the chrominance transducer means being adapted to effect line scanning of the chrominance component during the line blanking intervals of the scanning means for the luminance component, and means for interleaving by time division multiplex electrical signals derived from the luminance and chrominance transducer means.

2. A color television camera comprising means for splitting incident light into luminance and chrominance components, separate luminance and chrominance opto-electric transducer means arranged to receive on light sensitive surfaces thereof focused images of the luminance and chrominance components respectively of the incident light, the chrominance transducer means comprising a single transducer with a stripe filter arranged optically in front of the light sensitive surface thereof, the chrominance component being arranged to be focused as a single image on the light sensitive surface of the chrominance transducer, means for effecting line-by-line scanning of the light sensitive surfaces of the luminance and chrominance transducer means to produce electrical signals bearing luminance and chrominance information respectively, the scanning means for the chrominance transducer means being adapted to effect line scanning of the chrominance component during the line blanking intervals of the scanning means for the luminance component, a low pass filter and a band pass filter each connected to receive the output of the chrominance transducer, a demodulator connected to receive the output of the band pass filter, and a subtraction circuit connected to receive the output of the low pass filter and arranged to subtract therefrom a predetermined proportion of the putout of the demodulator, and means for interleaving by time division multiplex electrical signals derived from the luminance and chrominance transducer means comprising a switching device connected to receive the outputs of the subtracting circuit and the demodulator and a signal from the luminance transducer means, the switching device being adapted, during successive line periods of the signal from the luminance transducer means, to deliver the signal from the luminance transducer means for the major part of each line period and to deliver during the remainder of each line period the signals at the outputs of the subtraction circuit and the demodulator alternately line-by-line.

3. A color television camera comprising means for splitting incident light into luminance and chrominance components, separate luminance and chrominance opto-electric transducer means arranged to receive on light sensitive surfaces thereof focused images of the luminance and chrominance components respectively of the incident light, the chrominance transducer means comprising a single transducer, the chrominance component being arranged to be focused on the light sensitive surface of the chrominance transducer as two separate differently colored images, means for effecting line-by-line scanning of the light sensitive surfaces of the luminance and chrominance transducer means to produce electrical signals bearing luminance and chrominance information respectively, the scanning means for the chrominance transducer being adapted to scan the images alternately line-by-line in the line blanking intervals of the scanning means for the luminance transducer means, and means for interleaving by time division multiplex electrical signals derived from the luminance and chrominance transducer means.

4. A camera as claimed in claim 3, in which the two images are arranged to be focussed one above the other on the light sensitive surface of the chrominance transducer.

5. A camera as claimed in claim 3, in which the two images are arranged to be focussed side-by-side on the light sensitive surface of the chrominance transducer.

* * * * *

UNITED STATES PATENT OFFICE
CERTIFICATE OF CORRECTION

Patent No. 4,163,247          Dated July 31, 1979

Inventor(s) Gerd Bock, Gerd Brand, and Andreas Ilmer

It is certified that error appears in the above-identified patent and that said Letters Patent are hereby corrected as shown below:

On the Title Page, at Section [75]

DELETE "Grand"

ADD --Brand--

Signed and Sealed this

Eighth Day of April 1980

[SEAL]

Attest:

Attesting Officer

SIDNEY A. DIAMOND

Commissioner of Patents and Trademarks